Patented Jan. 19, 1926.

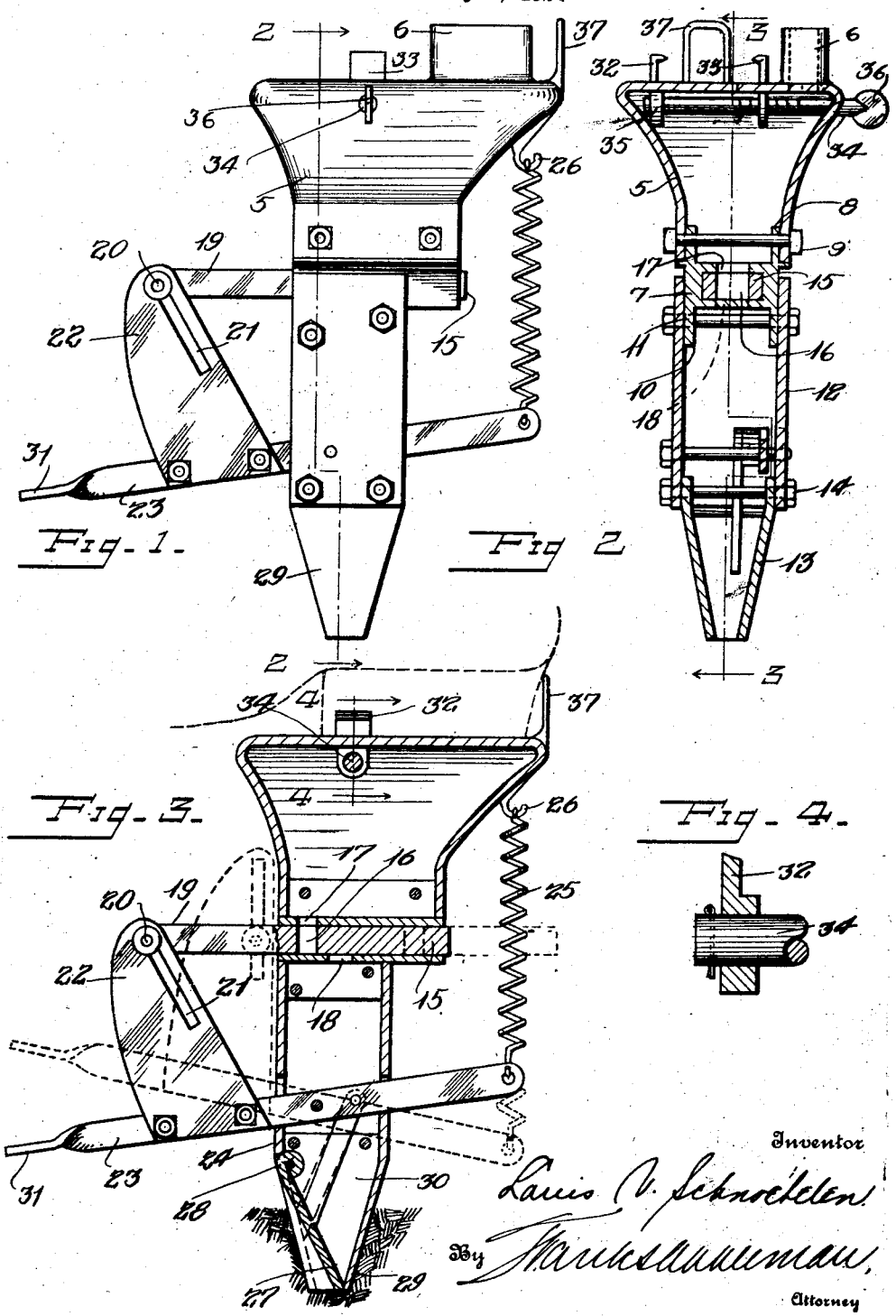

1,570,087

UNITED STATES PATENT OFFICE.

LOUIS V. SCHNOEBELEN, OF IOWA CITY, IOWA.

PLANTER.

Application filed July 3, 1924. Serial No. 724,029.

*To all whom it may concern:*

Be it known that I, LOUIS V. SCHNOEBELEN, a citizen of the United States of America, and resident of Iowa City, in the county of Johnson and State of Iowa, have invented certain new and useful Improvements in Planters, of which the following is a specification.

This invention relates to planters, and particularly to a dropper for corn or grain, adapted particularly for use in connection with replanting which occurs usually during the cultivation of the vegetation, as for instance, in the so-called plowing of corn or other crops.

It is an object of this invention to produce a planter adapted to be carried by the foot of an operator while riding on a cultivator, the said device being effective to drop any number of grains of corn, within a predetermined degree, in order that an operator may, while riding on a cultivator, replant certain hills of corn where the corn failed to sprout or develop; and, of course, it may be used in dropping beans or other seed, but in the further discussion of the invention herein the grain will be referred to as corn and it is to be understood that the applicability of the invention for distributing other seed will be included thereby.

It is a further object of this invention to provide a hopper associated with a discharge chute and a distributing valve or gate interposed between the hopper and the chute, with mechanical means for actuating the valve or cut-off when the device is manipulated, as will presently appear; and it is furthermore an object of this invention to produce a planter of the character indicated having means for attaching it to the shoe of an operator whereby the device may be applied to the soil in which the corn is to be deposited and moved to actuate the corn releasing mechanism.

It is a further object of this invention to produce a replanter of the character indicated which will prove efficient and satisfactory in use, and of simple construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a replanter embodying the invention;

Figure 2 illustrates a sectional view on the line 2—2 of Fig. 1;

Figure 3 illustrates a sectional view of the invention on a line corresponding with the line 3—3 of Fig. 2; and Figure 4 illustrates an enlarged detail sectional view on the line 4—4 of Fig. 3 with the shaft in elevation.

In these drawings, 5 denotes a hopper having a spout 6 communicating with it at the top, through which corn may be delivered to the hopper. The hopper is provided with a floor or bottom closure 7 having flanges 8 fitting inside the hopper, the said flanges and hopper being connected together by fastenings 9, such as bolts or the like. The closure 7 is provided with depending flanges 10 to receive fastenings 11 such as bolts by which the chute 12 is attached to the hopper closure, and a shoe 13 is secured to the bottom of the chute, and is adapted to be forced into the soil in which corn is to be dropped. The shoe is secured to the chute by fastenings 14 such as bolts, although the details of construction with respect to the arrangement of the chute and shoe may be changed to suit particular requirements within the scope of the claims without departing from the spirit of the invention. The closure 7 has a longitudinally extending channel in which a gate or valve 15 is slidable, the said gate being provided with a vertically disposed aperture 16 constituting a seat in which corn is deposited from the hopper, which corn is then delivered to the chute, as will presently appear.

In order that corn may escape from the hopper without passing directly to the chute, the floor is provided with apertures 17 and 18 in its upper and lower walls respectively, and the said apertures are in staggered relation to each other in order that corn escaping from the hopper into the aperture of the gate will be held therein until the gate has been moved to bring its aperture into registry with the aperture 18 that permits the corn to escape into the chute, so that the gate alternately receives corn from the hopper and delivers it to the chute as the device is manipulated, as will presently appear.

The gate has an extension 19 with a pin 20 extending therethrough, which pin operates in a slot of an arm 22, the said arm being carried by a lever 23 mounted on a pivot 24 extending transversely of the chute. The pivot may be secured to the sides of the chute in any appropriate way. The lever has a spring 25 connected to it, the said spring being anchored to the hopper as by a lug 26, or the like, and the said spring is effective to operate the lever in one direction and to restore the parts to their normal positions, as shown in full line (Figs. 1 and 3), whereas the lever is operated by manipulation, as will presently appear, to cause the lever 23, arm 22 and gate 15 to assume the dotted line positions shown in Fig. 3. The lower end of the shoe is normally closed when the lever 23 is in its full line position shown in Fig. 3, and the said shoe has a closure 27 hinged in any appropriate way as at 28 in order that the closure may be moved with relation to the stationary wall 29 of the shoe. The closure has a link 30 connected to its inner surface and the said link is carried by the lever 23 in practically a vertical line so that when the end of the lever having the spring is depressed, it will produce a thrust motion to the link with sufficient range to cause the closure to swing and displace soil for the reception of the corn to be planted.

The end of the lever remote from the spring has a bearing plate 31 which is adapted to be forced into contact with a fixed object or the surface of the ground being treated in order that when the operator lowers his foot to cause the shoe to be imbedded in the soil, he may, by slight forward movement of the foot, press the plate 31 against the surface of the ground and cause the lever to assume the dotted line position shown in Fig. 3, whereas upon lifting the planter clear of the ground, the spring will operate to retract the parts to the full line positions, as will be understood.

The device is intended to be secured to the shoe of an operator, and while any appropriate means may be provided in the broad embodiment of the device for holding the planter on the shoe, the inventor has found it desirable to employ a stationary clamp 32 and a movable clamp 33 which are intended to engage opposite sides of the heel of a shoe, the last mentioned clamp being movable with relation to the stationary clamp by a threaded key 34 that is journaled in a boss 35 of the stationary clamp and through the wall of the hopper, the said key terminating in a handle 36 by which the key may be turned to adjust the movable clamp and force it against the shoe to anchor the device on the heel.

As a further means for holding the device on the foot of an operator, a staple, lug or the like, 37, is secured to the hopper and rises thereabove to receive a strap (not shown), which may be passed around the ankle of the operator so that the device will be secured in place somewhat after the manner that skates are secured on the foot of a user. This arrangement of parts will permit the operator to have the planter suspended from his foot ready to be manipulated in forcing the shoe into the soil and rocking the planter slightly to cause the actuation of the lever, as has been explained. It will be apparent, therefore, that if corn is in the hopper when the parts are in the positions shown in Fig. 3, the corn will escape through the aperture 17 into the aperture of the gate where it will remain during said positions of the parts, whereas when the device is manipulated and the gate is moved from the position shown in Fig. 3, the aperture in the gate will pass the aperture 18 and permit the corn to escape into the chute and it will descend through an opening in the shoe created by the movement of the shoe closure, whereas when the planter is elevated or lifted from contact with the soil, the parts will be moved under the influence of the spring 25.

I claim:

In a corn planter, a hopper, means thereon for attaching it to the shoe of an operator, a chute extending downwardly from the hopper and communicating therewith, a slidable gate between the hopper and chute operative to transfer seed from the hopper to the chute, a shoe at the lower end of the hopper having an opening for the escape of the seed, a closure hinged in the shoe in such relation to the wall of the shoe as to guard and unguard the discharge opening in the shoe, a pivot extending through the chute, a lever extending through opposed walls of the chute and mounted on the pivot, a link connecting the said lever with the closure, an arm secured to the lever, the said arm projecting into operative relation with the gate and having a slot, a stud on the gate operating in the said slot of the arm, a bearing plate on one end of the lever adapted to be pressed into engagement with the soil, and means for exerting a pull on the other end of the lever.

LOUIS V. SCHNOEBELEN.